July 20, 1965 R. H. MERCER 3,195,816
LOW-VOLTAGE SPRINKLER CONTROL SYSTEM
Filed March 13, 1962

INVENTOR.
RICHARD H. MERCER
BY
Ralph L. Freeland, Jr.
ATTORNEY

United States Patent Office 3,195,816
Patented July 20, 1965

3,195,816
LOW-VOLTAGE SPRINKLER CONTROL SYSTEM
Richard H. Mercer, 16 Barber Ave., San Anselmo, Calif.
Filed Mar. 13, 1962, Ser. No. 179,349
2 Claims. (Cl. 239—63)

This invention relates to an automatic controller for an irrigating system. More specifically, it relates to a low-voltage, alternating-current, soil-moisture detector to control automatically the operation of a sprinkler system.

A main object of my invention is to operate safely a sprinkler control system that uses alternating current as supplied to homes by an electric power company. In this control system, a pair of moisture-measuring electrodes detect the water content of the soil with alternating current at a potential of not more than about 2 volts supplied through a voltage-dividing circuit that limits the total current available at the electrodes. In a preferred form, these measuring electrodes are further isolated from the power source by a step-down transformer. A control circuit is then operated by current flow in the voltage-dividing circuit through another isolating circuit that includes a voltage divider and a transistor. The output circuit of the transistor controls flow of direct current to a solenoid valve or the like that regulates water flow to a sprinkler system. In the preferred form, the source of direct current is another winding on the isolating transformer and a solid-state rectifier which prevents high-voltage alternating current from entering either the transistor or the supply circuit of the measuring electrodes, even if several elements of the control circuit fail.

While it has been proposed to control water systems with normal household power, generally 110 volts A.C., such previous circuits have been too dangerous to humans and animals that may accidentally come in contact with the measuring or detecting electrodes, because no effective isolation was available between the source and the electrodes. Although some alternating-current systems have used low voltage in the detector circuit, failure of their electrical elements have presented too many hazards to the user. Alternately, direct-current systems have been proposed, but these systems required special electrodes to prevent polarization, and either special rectifier systems or battery supplies for power.

In accordance with this invention, these problems of electrical-component failure in alternating-current systems and power-supply problems in direct-current systems are avoided. Other objects will become apparent from the following detailed description when taken in conjunction with the accompanying drawings, in which.

Figure 1:
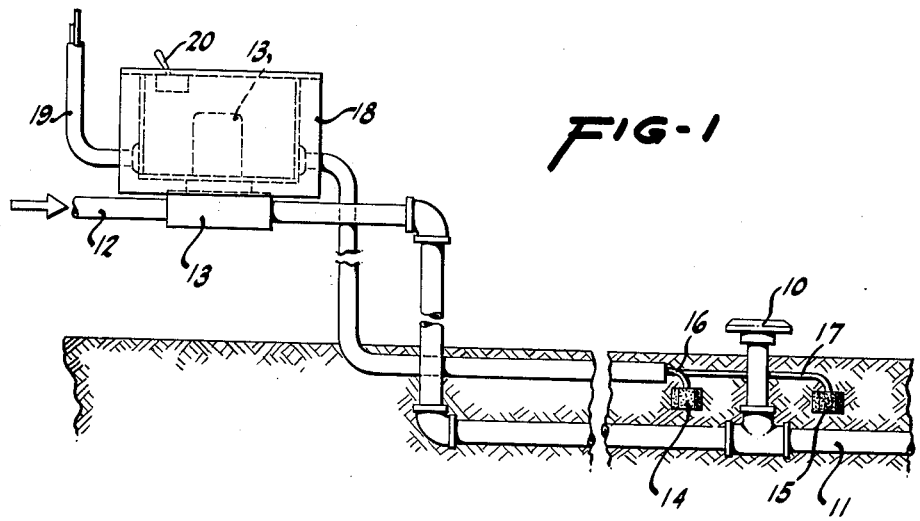
FIG. 1 is a perspective view of a sprinkler system adapted to use the control circuit of the present invention.

Referring now to the drawings, FIG. 1 indicates a lawn sprinkler or overhead irrigation system intended to be controlled by my measuring and control system. A plurality of sprinkler heads 10, only one of which is shown, sprays water over the ground when water enters distribution line 11 from supply line 12. Flow to heads 10 is cut on and off by solenoid valve 13 when required by the moisture content of the ground in the area covered by the sprinkler heads.

Electrodes 14 and 15 are separated a suitable distance apart, 1 to 3 feet, generally around 18 inches, depending upon the type of soil. They are buried anywhere from surface to root depth. Carbon is selected as the material to avoid electrochemical action that would destroy the electrodes or polarize them in soils containing soluble metal ions. Leads 16 and 17 to electrodes 14 and 15, respectively, are also buried, but primarily for aesthetic reasons.

As will be explained below, leads 16 and 17 carry no potential higher than about 2 volts A.C., the same as that across electrodes 14 and 15, above ground potential. Likewise, the current flow in lines 16 and 17 and the electrodes is limited so that electrical power, lethal to humans or animals, cannot enter these exposed units. Further in this regard, it is desirable for solenoid valve 13, enclosing case 18, controller 20, and one side of electrical power lines 19 to be grounded through supply pipe 12, and distribution line 11 if the latter is metal. The location of solenoid valve 13 is not critical; it can be above or below ground. For convenience, controller 20 and valve 13 are usually above ground to permit easy adjustment of the setting indicating the moisture content of the soil at which the unit sends water to sprinkler heads 10. The desired value of moisture may be controlled through calibration of meter 22 and adjustment of potentiometer 24, indicated schematically in FIG. 2.

Figure 2:
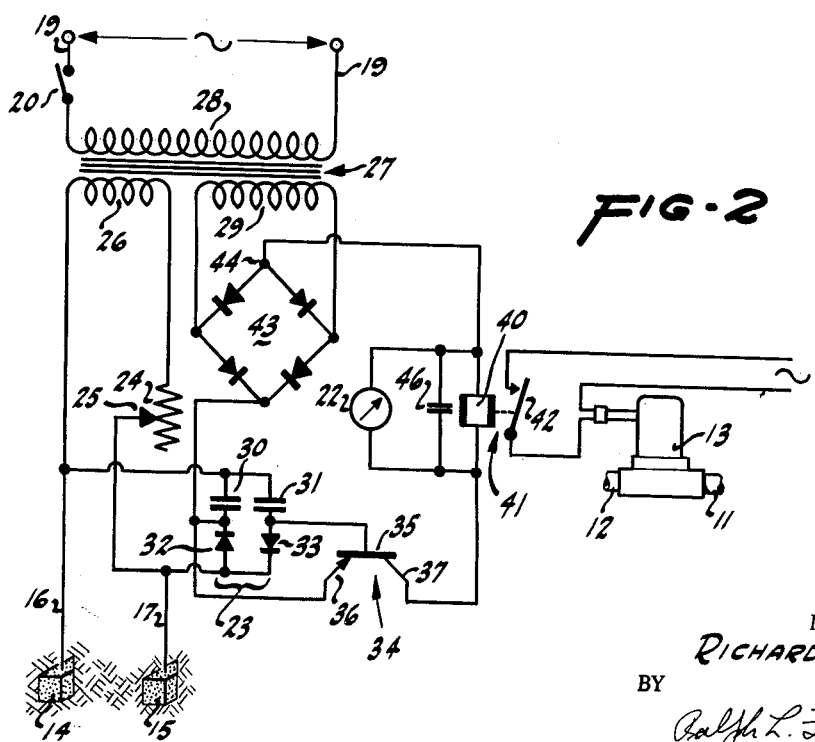
FIG. 2 is a circuit diagram of a preferred form of the sprinkler control system used in FIG. 1.

Control of water flow to sprinkler head 10 by solenoid 13 will now be described with the aid of the electrical control circuit shown in FIG. 2. As there seen, electrodes 14 and 15 are in series with a potential-dividing circuit that includes a 6-volt secondary winding 26 of power transformer 27, potentiometer 24, and the variable resistance of the soil, and its water content, between the electrodes. Power leads 19 supply 110 volts A.C. to primary winding 28 through switch 20. Automatic control of the sprinkler system can be interrupted by opening switch 20. The position of contact 25 on potentiometer 24 determines the total potential applied between electrodes 14 and 15. While this potential value is variable to permit a desired change in moisture content of the soil between turn-on and -off of the sprinkler system, it is purposefully limited to apply no more than about 2 volts A.C. to leads 16, 17 and electrodes 14, 15. By dropping the applied voltage from 6 volts at winding 26 to not over 2 volts at the electrodes, an effective current limit is also placed on this circuit. Thus, the measuring circuit is safe at all times.

Because this potential in the measuring circuits varies only a few millivolts at a level of between zero and 2 volts, it is desirable to multiply this signal or potential to control the solenoid operating circuit. For this purpose, a voltage-doubler circuit 23, including condensers 30 and 31 and rectifiers 32 and 33, is in parallel with electrodes 14 and 15. Rectifiers 32 and 33 are of reversed polarity, so that they supply an essentially direct-current signal between base 35 (the control electrode) and emitter 36 of transistor 34. The potential between base 35 and emitter 36 controls direct-current flow through coil 40 of relay 41, which in turn controls power to solenoid valve 13 through contact 42.

In this control circuit, it will be noted that a full wave rectifier 43 is connected across another secondary winding 29 on transformer 27. Although this winding desirably places 25.2 volts A.C. across rectifier 43, the output potential from terminals 44 and 45 of rectifier 43 is direct current at about 24 volts. This output circuit is connected in series with relay coil 40 and transistor 34. Emitter 36 and collector 37 connect transistor 34 into this power circuit. It will again be noted that, even if several of the circuit components in this circuit fail simultaneously, no dangerous high-voltage alternating currents can flow into the measuring circuit.

Meter 22 is in parallel with coil 40 to permit the user to vary the position of tap 25 on potentiometer 24 and watch the potential change across coil 40. Since coil 40 will require a fixed potential difference to actuate contact 42, the exact setting can best be controlled by noting voltage readings on meter 22. Condenser 46 aids in damping voltage fluctuations that may cause "chatter" of the armature of relay 41. It also damps current surges when relay 41 opens.

From the foregoing description, it will be seen that a decrease in moisture content in the soil between electrodes 14 and 15 will increase the potential across the voltage-divider circuit. This raises the output voltage from voltage-doubler circuit 23 to the control circuit of transistor 34. Transistor 34 then permits direct current flow between its emitter 36 and collector 37. When this current exceeds the closing potential of coil 40, solenoid 13 opens its valve to turn on the sprinkler system. After enough water is added to the soil to decrease the resistance between electrodes 14 and 15, the current flow between them increases. This drops the potential available at base 35 until it drops below the cut-off potential of transistor 34. At this point, the direct-current supply to coil 40 stops, and solenoid 13 is cut off. This stops water flow to sprinkler heads 10.

While not shown in the drawings, if desired a time switch can be used to assure that the sprinkler system comes on only when water pressure in the utility mains is at its highest pressure. This is usually at night and in the early morning.

To prevent inadvertent operation while the watered area is in use, switch 20 can be thrown to open one of leads 19 to transformer 27. This disables the entire control unit.

Various modifications in the control system of my invention will now become apparent to those skilled in the art. For example, the type of transistor will determine the polarity and voltages needed to operate the circuit elements. Other changes falling within the spirit and scope of the appended claims are intended to be included therein.

I claim:

1. An automatic sprinkler control system for maintaining the moisture content of soil at a predetermined value which comprises a transformer having a primary winding connectible to a source of alternating current and a secondary winding forming a low-potential A.C. source, a pair of nonpolarizable electrodes connected across said low-potential A.C. source in series with a current- and voltage-limiting resistor, a potential-sensing bridge circuit having its input terminals connected in parallel with said electrodes, the arms of said bridge circuit comprising condenser means and rectifier means connected to double the input voltage at the output terminals of said bridge circuit, said birdge circuit being connected across the control terminals of a transistor to isolate mutually said electrodes from said transistor, and relay means connected across the output terminals of said transistor and in series with another source of direct current, said other source including another secondary winding of said transformer and other rectifier means connected thereacross.

2. For use in controlling the moisture content of soil by automatic operation of a sprinkling system when said moisture content falls below a predetermined value, a pair of nonpolarizable electrodes adapted to be buried at spaced-apart locations in the soil, a source of alternating current not exceeding about 7 volts connected across said electrodes, a current- and potential-limiting resistor in series with said electrodes and said source to prevent the potential across said electrodes exceeding about 2 volts A.C., a potential-sensing bridge circuit having its input terminals connected directly across and in parallel with said electrodes, the arms of said bridge circuit comprising condenser means and rectifier means connected together to convert said A.C. current flow between said electrodes to an amplified direct-current value at the output terminals of said bridge circuit, and an independent power circuit for supplying an operating potential to solenoid valve means for control of a sprinkler system operative over the area where said electrodes are buried, said power circuit including a transistor, the control terminals of said transistor being connected to said output terminals of said bridge circuit so that said transistor and said pair of electrodes are mutually isolated from each other by said bridge circuit and the power terminals of said transistor being connected in series circuit with said power circuit.

References Cited by the Examiner
UNITED STATES PATENTS

| | | | |
|---|---|---|---|
| 2,578,981 | 12/51 | Parker | 324—65 X |
| 2,611,643 | 9/52 | Higgins | 137—78 X |
| 2,781,228 | 2/57 | Anderson | 318—483 X |
| 2,785,006 | 3/57 | Young et al. | 137—78 X |

ORIS L. RADER, *Primary Examiner.*